Patented Jan. 18, 1938

2,105,977

UNITED STATES PATENT OFFICE 2,105,977

PROCESS OF MAKING FOOD PRODUCT

Gaston J. Ley, John H. Payne, and George Akau, Honolulu, Territory of Hawaii, dedicated to the free use of the People of the United States No Drawing. Application January 14, 1937, Serial No. 120,504

2 Claims. (Cl. 99—93)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to us of any royalty thereon.

We hereby dedicate the invention herein described to the free use of the people of the United States, to take effect on the granting of a patent to us.

Our invention consists in the discovery of a means for altering the viscous nature of cooked taro in such a manner that the general processing and more particularly the drying of same are rendered commercially feasible.

In the manufacture of flour or other dehydrated materials from taro, the raw corms are cooked, peeled, and washed. The material containing around 70% moisture must then be dried to a moisture content of around 10%. This is accomplished by slicing or dicing the corms and subjecting the reduced material to a current of heated air. Or the corms can first be ground into a paste, this paste spread out in thin layers and subjected to the same treatment.

Cooking is an essential step in the preparation of taro flour. The cooked corms are mushy and exceedingly viscous and are incapable of reduction in size by any known mechanical device other than a grinder. The ground material, known as "paiai" is exceedingly viscous. Hand slicing is slow and costly, due to the fact that the sliced pieces stick together tenaciously. Spreading of the slices or paste onto trays for drying is likewise difficult, for the same reason. In drying the product tends to case-harden, check, and dry unevenly. When thoroughly dry it becomes exceedingly hard and brittle, and any subsequent grinding operations are consequently slow and consume much power. The dried product is always unevenly colored, darkening on the surfaces which are exposed to the most air and heat.

By our invention use is made of the discovery that refrigeration of cooked taro, or of the physically altered derivative of cooked taro, does away completely with the naturally viscous state of these materials and leaves in their place products which are entirely free of viscosity or gumminess and can be handled readily as hereinafter described.

The taro corms are cooked, peeled, and washed as usual. The cooked corms are then either directly subjected to refrigeration in the manner described below, or are subjected to one of the several following methods of treatment prior to refrigeration.

a. The cooked taro is ground into a paste. This product is known in Hawaii as "paiai".

b. The product is ground into a paste and allowed to undergo a limited spontaneous fermentation.

c. The product is ground into a paste and mixed with desired amounts of other materials such as salt, sugar, other flavorings, other semi-solids or solid materials such as pineapple pulp, etc.

d. The product is subjected to the same treatment as in (c), except that before refrigeration it is permitted to undergo limited spontaneous fermentation.

The treated or untreated material is then stored in suitable containers at a temperature below 40° F., but not sufficiently low to cause actual freezing of the material.

The material thus stored undergoes a gradual solidification. At the end of about 30 hours the inherent viscosity of the material will in all cases have disappeared. If the material is in the shape of taro corms, these will have become hard and firm. If the material is in the shape of a paste, this paste will have set into a solid, rubbery mass which can readily be cut with a knife into any desired shape, even into paper-thin slices. The resulting aggregates show no tendency to stick together and feel dry to the touch. If fermentation has previously taken place the texture of the refrigerated material will be porous as a result of the liberation of gas within the body of the material.

Ordinarily cooked taro or taro paste very rapidly undergoes fermentative and putrefactive changes if kept under ordinary atmospheric conditions. These processes are greatly retarded in material which has previously been subjected to refrigeration.

The refrigerated material, after removal from the container, is cut into blocks of suitable size to be fed into the hopper of a mechanical shredding or slicing machine. These blocks will pass through the machine at a very rapid rate without, in any way, clogging the machine even if operated over an extensive period of time.

The sliced or shredded material is then readily spread on trays either by hand or mechanically, and subjected to hot air drying in a cabinet drier.

The material is dried at an initial temperature of about 150° F. This temperature is gradually raised over a period of from four to five hours. At the end of this period a temperature of about 200° F., will have been reached, at which time the material on the trays will be found to contain from 7 to 10 per cent moisture. This dry material is now in the form of separate shreds or slices which can be readily fed into any commercial grinding mill and reduced by a series of grinding and sifting operations into flour of the desired mesh.

Instead of being ground into flour, a portion of the shredded material is at this stage converted into a dry cereal. When it is desired to produce dry cereal the shreds are removed from the drier and subjected to roasting. The roasted material varies in flavor and composition depending on the nature of the previous treatment of the cooked taro as described above.

Having thus described our invention, what we claim for Letters Patent is:

1. A method of rendering cooked taro non-viscous, which comprises subjecting cooked taro to a temperature slightly above freezing for a period of substantially 30 hours.

2. In the preparation of taro flour, the process which comprises cooking, peeling and washing taro corms, thence subjecting the cooked taro to a temperature slightly above freezing for a period of substantially 30 hours, thence slicing, drying, grinding and sifting the material.

GASTON J. LEY.
JOHN H. PAYNE.
GEORGE AKAU.